United States Patent [19]

Brewer et al.

[11] Patent Number: 5,551,816

[45] Date of Patent: Sep. 3, 1996

[54] REMOVABLE RIVET AND METHOD OF REMOVING THE HEAD FROM THE SHANK OF THE RIVET

[75] Inventors: Jonathan L. Brewer, Dunstable; Keith Denham, Welwyn Garden City; Neil J. Sherry, Knebworth, all of England

[73] Assignee: Avdel Systems Limited, Welwyn Garden City, England

[21] Appl. No.: 420,057

[22] Filed: Apr. 11, 1995

[30] Foreign Application Priority Data

Apr. 12, 1994 [GB] United Kingdom .................. 9407181

[51] Int. Cl.$^6$ .............................. F16B 13/04; F16B 13/06
[52] U.S. Cl. ................................ 411/43; 411/70; 411/501; 29/426.4
[58] Field of Search ................................ 411/43, 69, 70, 411/500–507; 29/426.4

[56] References Cited

U.S. PATENT DOCUMENTS

| | | | |
|---|---|---|---|
| 3,300,798 | 1/1967 | York | 411/43 X |
| 4,184,408 | 1/1980 | Smith et al. | 411/70 X |
| 4,541,761 | 9/1985 | Bryce, Jr. | |

FOREIGN PATENT DOCUMENTS 3612501  10/1987  Germany .................. 411/43

OTHER PUBLICATIONS

Patent Abstract of Sweden, AN–90–056773/08, SE–8802–436, Dec. 30, 1989.
Patent Abstract of Switzerland, AN–86–106899/17, CH–654–762, Mar. 14, 1986.
AVDEL Limited, 1 page, "7994 Series Jo–Bolt Removal Equipment Data".
Research Disclosure, No. 276, p. 183, Apr. 1987, "Self Piercing Blind Break Rivet with Removable Head".

*Primary Examiner*—Neill R. Wilson
*Attorney, Agent, or Firm*—Oblon, Spivak, McClelland, Maier, & Neustadt, P.C.

[57] ABSTRACT

A removable rivet which includes a shank and a preformed head located at at least one end of the shank, the shank being insertable through workpieces and being capable of being permanently deformed to rivet the workpieces together. The rivet includes an annular groove at the junction of the shank and the head, the annular groove extending radially inwardly of the diameter of the shank, thereby to facilitate separation of the head from the shank when a drill of diameter substantially equal to that of the shank is applied to the head of an installed rivet co-axially with the shank until the drill meets the annular groove; an annular rim carried by the head of the rivet for cooperating with a drill, thereby to locate the drill co-axially with the annular groove; and abutment faces carried by the head of the rivet for engaging dogs of a non-rotating sleeve of the drilling apparatus thereby to prevent rotation of the rivet under the influence of the rotating drill.

20 Claims, 4 Drawing Sheets

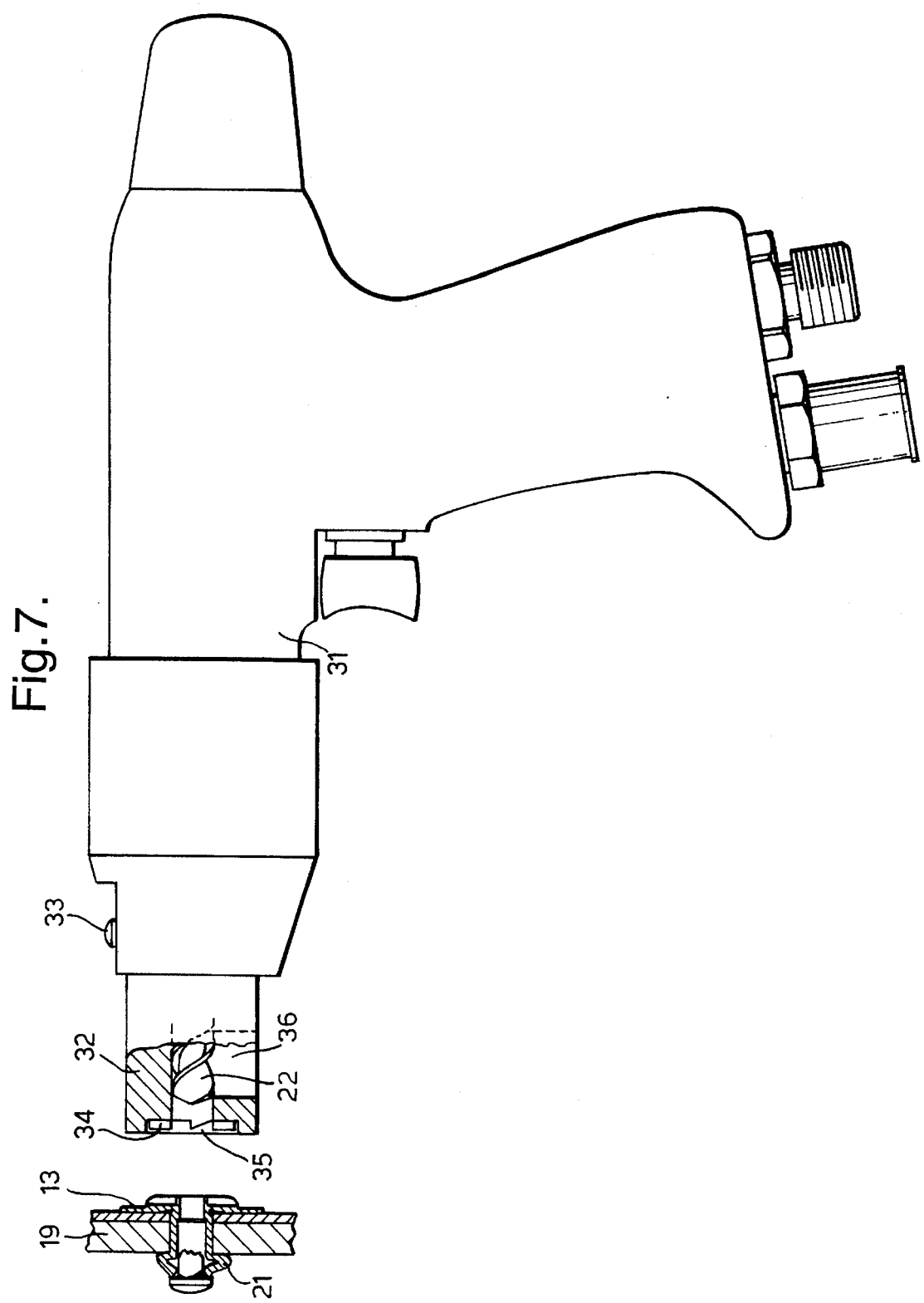

5,551,816

REMOVABLE RIVET AND METHOD OF REMOVING THE HEAD FROM THE SHANK OF THE RIVET

BACKGROUND OF THE INVENTION

1. Field of the Invention

The present invention is directed to a removable rivet having a preformed head located at at least one end of the shank of the rivet.

2. Discussion of the Background

Rivets, whether blind (i.e. settable by access to one side only of the workpieces) or non-blind (i.e. settable by access to both sides of the workpieces) are set or installed by being permanently deformed, and are intended to form permanent joints. They are not intended to be removed. In this context, the term "rivet" is used to designate any such fastener which is not intended to be readily removable, and may include types of fastener outside of those which are commonly known as "rivets" in the fastener trade and in engineering practice.

However, it sometimes happens that the workpieces must be later separated, e.g. for repair, or unforeseen servicing, of the structure of which they form part. Consequently it is then necessary to remove one or more rivets. Since in most cases it will be necessary to remake the disassembled joint, it will be necessary on reassembly to install a replacement rivet in the same overlying holes in the workpieces. Accordingly removal of the rivet must not damage or distort the hole or its surrounding workpieces.

It is usually found that it is sufficient to separate the head of the rivet from its shank. Since there is relatively little engagement between the shank of a set rivet and the adjacent wall of the workpiece hole, the shank and the integral head at its other end are then easily removed.

U.S. Pat. No. 4,451,761 discloses a rivet with an annular groove at the junction of the head and shank, for the purpose of weakening the junction so that the rivet head can be torn off the shank by gripping the head and pulling manually with a pair of pliers. This solution would be applicable where the material of the shank and head is relatively soft and weak (e.g. alluminium). However it would not be applicable to rivets made of stronger material (e.g. steel).

Since rivets are commonly circular in cross-section, comprising a cylindrical shank, one convenient way of detaching the head from the shank would be by drilling out. That is to say, a drill having a diameter the same as, or slightly larger than, the diameter of the rivet shank, is applied to the head co-axially with the rivet shank, so that it drills through the head until it meets the adjacent end of the rivet shank. If the drill is positioned accurately, little or no material remains connecting the head and shank, and the two are easily separated. However, if the drill is not accurately located co-axially with the shank, it will damage the workpiece. Since the drill must reach the circle at which the head and shank mutually abut the nearer end of the workpiece hole, damage to the workpiece around the hole is very likely. Furthermore, the rivet may spin in the hole before separation, ,due to engagement with the rotating drill, thereby frustrating the drilling operation and also possibly damaging the workpiece.

SUMMARY OF THE INVENTION

The present invention is intended to provide a rivet which overcomes this problem.

The invention provides, in one of its aspects, a removable rivet comprising a shank and a preformed head at at least one end of the shank, the shank being insertable through workpieces and being capable of being permanently deformed to rivet the workpieces together, the rivet comprising the following features in combination:

an annular groove at the junction of the shank and the head, the annular groove extending radially inwardly of the diameter of the shank, thereby to facilitate separation of the head from the shank when a drill of diameter substantially equal to that of the shank is applied to the head of an installed rivet co-axially with the shank until it meets the annular groove;

locating means carried by the head of the rivet for cooperating with a drilling apparatus comprising a drill, thereby to locate the drill co-axially with the annular groove; and engaging means carried by the head of the rivet for engaging a non-rotating part of drilling apparatus thereby to prevent rotation of the rivet under the influence of the rotating drill. Preferably the annular groove lies entirely within the head, thereby to facilitate separation of the head from the shank by the drill as aforesaid without the need for the drill to enter the shank. In a preferred embodiment, the aforesaid locating means comprises an annular rim or boss. Preferably the head of the rivet is provided with centering means, which centering means is engageable by a drill to assist in centering it co-axially with the rivet shank. In a preferred embodiment, the centering means comprises an annular rim or boss. Preferably the engaging means is such that the initial angular orientation of the non-rotating part of the drilling apparatus with respect to the engaging means is not critical. The engaging means advantageously comprises a plurality of abutments spaced apart angularly around the rivet head and the radially outer ends of the abutments preferably also provide at least part of the locating means.

The invention includes a method of separating the head from the shank of a rivet as aforesaid, which method comprises the steps of drilling through the head of the rivet with a drill which has substantially the same diameter as the rivet shank and substantially co-axially aligned therewith, until the drill breaks into the annular groove.

The invention also includes a method of separating the head from the shank of a rivet as aforesaid, using a drilling apparatus comprising:

a rotatable drill;

locating means for cooperating with the locating means on the rivet thereby to locate the drill co-axially with the annular groove; and engaging means on a non-rotating part of the drilling apparatus for engaging with the engaging means on the rivet head thereby to prevent rotation of the rivet as aforesaid.

A specific embodiment of the invention will now be described by way of example and with reference to the accompanying drawings, in which:

FIG. 7 is a side elevation of the removal tool in a position corresponding to FIG. 4.

DESCRIPTION OF THE PREFERRED EMBODIMENT

Figure 2:
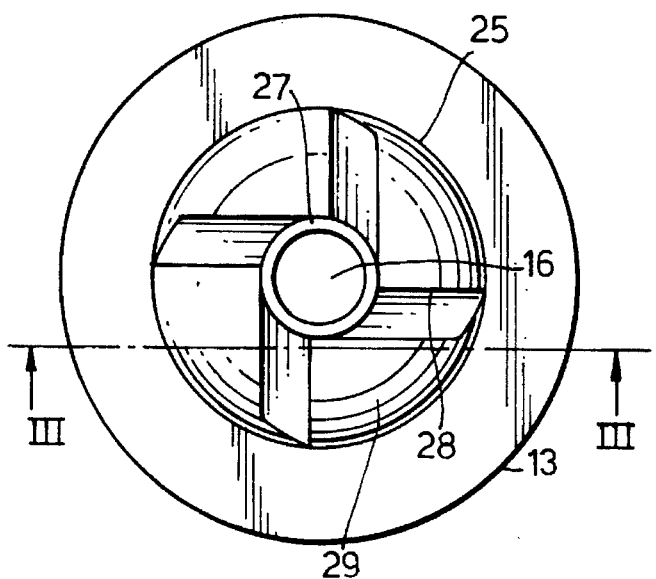
FIG. 2 is plan view of the top face of the rivet head before assembly on to the stem.
Figure 1:
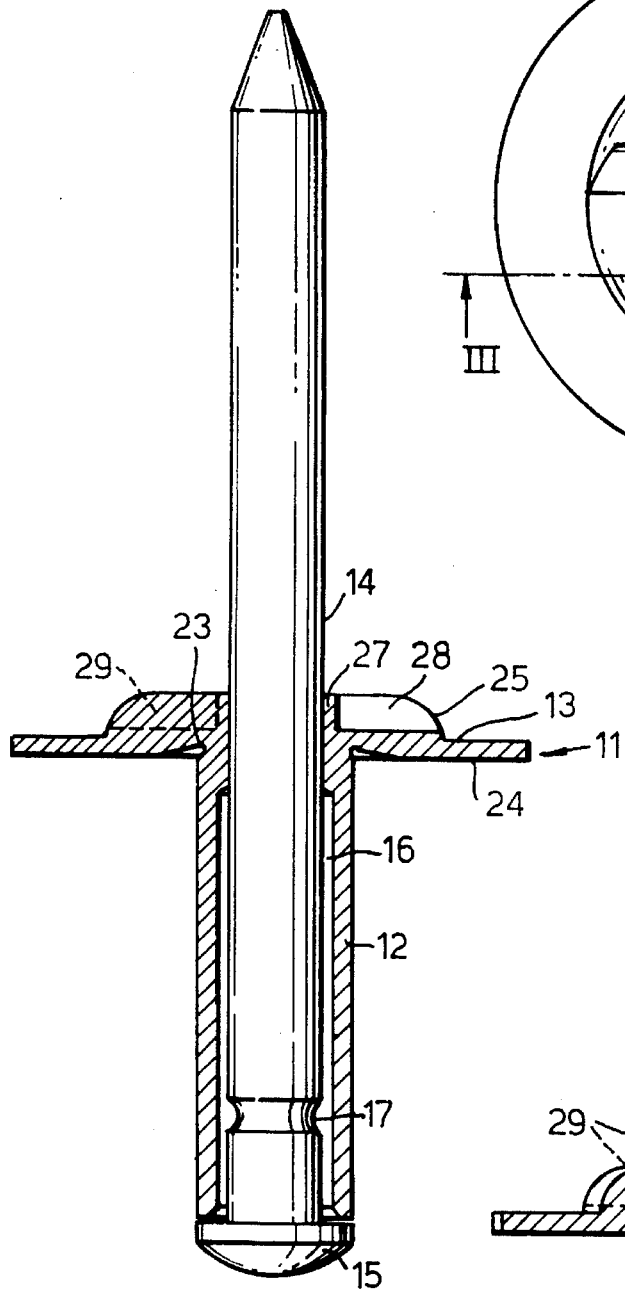
FIG. 1 is a longitudinal axial section through a blind rivet assembly before installation.
Figure 3:
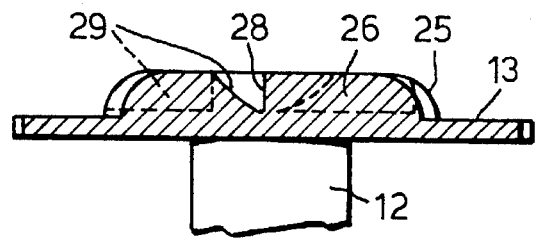
FIG. 3 is a section through the rivet head on the line III—III of FIG. 2.

The rivet in this example is a blind rivet 11 comprising a tubular shank 12 with an integral pre-formed head 13. The rivet forms part of an assembly which includes a stem 14 extending through the rivet bore 16 and having a pre-formed head 15, which lies outside and adjacent to the tail end of the rivet shank 12. The stem 14 includes a breakneck 17 spaced a short distance from the head 15. The rivet and stem are both made of steel.

Blind rivets of this type are well known, and are widely available under the registered trademark STAVEX.

In use, (see lower part of FIG. 4), the rivet is set or installed by inserting the shank through a clearance hole 18 in a workpiece 19 which comprises two panels, e.g. of metal, which are to be joined thereby, until the flat underface 24 of the rivet head 13 abuts the near face. Tension is applied to the stem 14 while the rivet head 13 is supported against the workpiece, so that the rivet shank buckles and bulges to form a blind head 21 which clamps the panels together. The stem then breaks at the breakneck 17, leaving the head 15 of the stem plugging the rivet bore 16. This form of blind riveting is well known.

Figure 4:
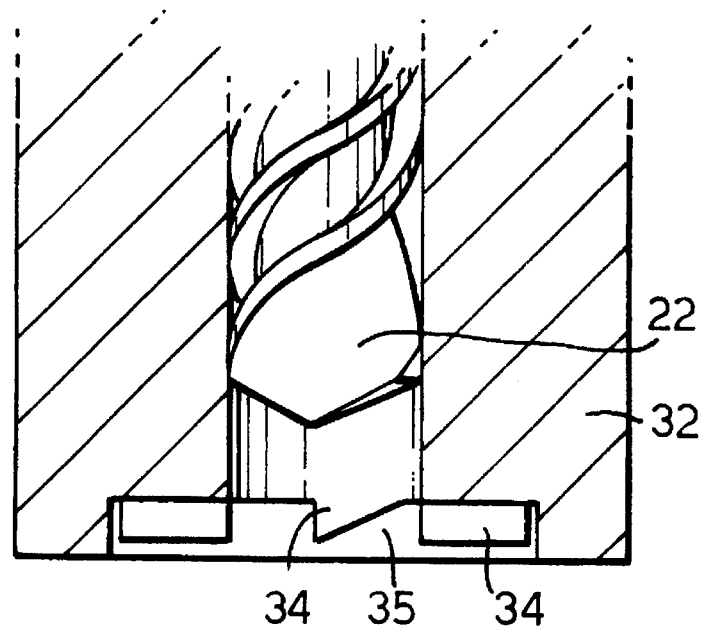
FIGS. 4, 5 and 6 are sections, similar to FIG. 1, through the installed rivet and the front end of a removal tool, illustrating successive stages in the use of the tool.
Figure 4:
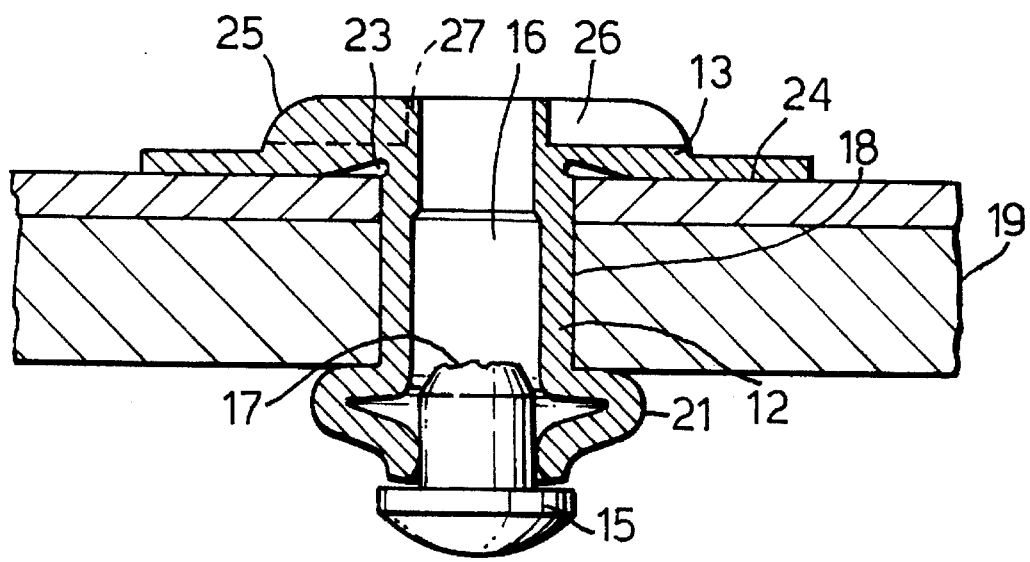
Figure 5:
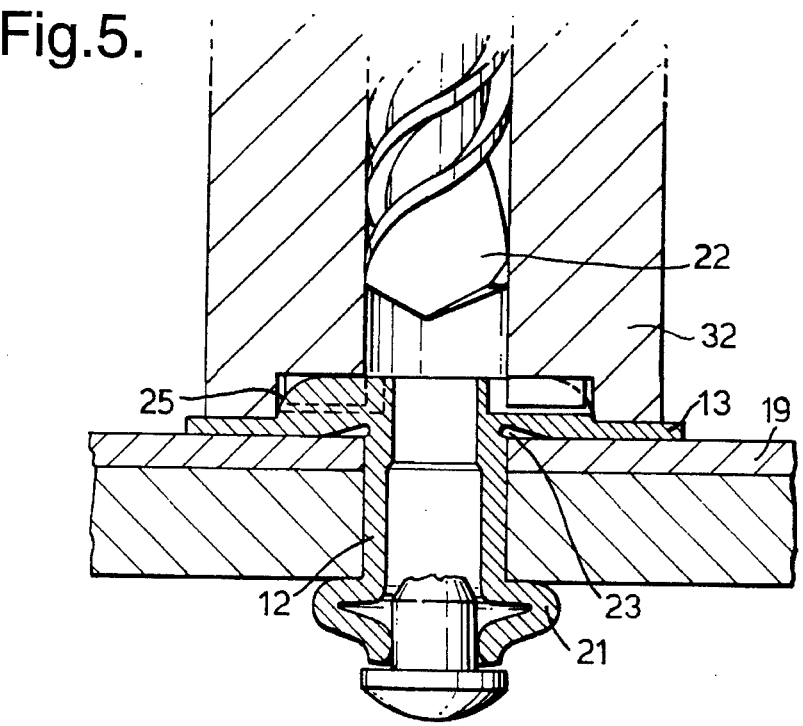
Figure 6:
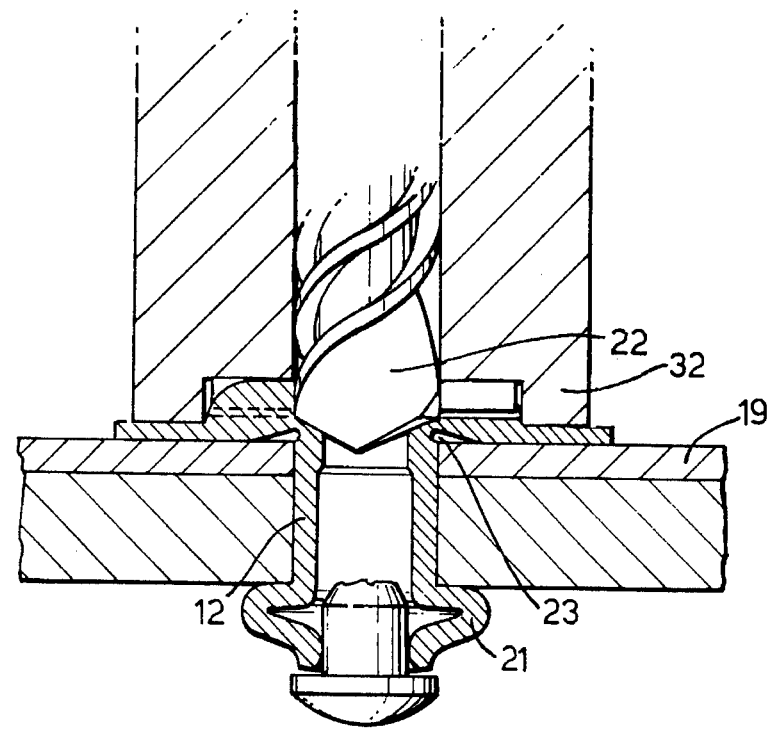

The rivet of this example is intended to facilitate removal of the installed rivet, if necessary. This removal uses a drill 22 which has substantially the same diameter as the rivet shank 12. The drill is applied to the head of the rivet, co-axially with the rivet shank, by means which will be described below. In order to facilitate separation, by the drill, of the rivet head 13 from the rivet shank 12, while minimizing the risk of damage by the drill to the workpiece 19', the rivet is provided with an annular groove 23 at the junction of the head 13 and shank 12. As illustrated in FIGS. 4, 5 and 6, the annular groove is located within the head 13, i.e. its position axially of the rivet is on the head side of the flat underface 24 of the head. The annular groove 23 opens onto the radially inner part of the underface 24 of the head, and extends radially inwardly of the diameter of the rivet shank 12.

The result is that, when the drill 22 enters the rivet head co-axially with the shank and progressively penetrates the rivet head towards the shank, the radially outer part of the tip of the drill breaks into the radially inner part of the annular groove 23 before the radially outlet part of the drill tip reaches the level of the head underface 24 and the abutting face of the workpiece 19. This is illustrated in FIG. 6. Thus the rivet head 13 is detached from the rivet shank 12 and its integral blind head 21, which can be pushed out of the hole 18.

The head 13 of the rivet is provided with locating means or device for co-operating with drilling apparatus thereby to locate the drill 22 co-axially with the annular groove 23. The locating means comprises an annular rim 25 provided by the peripheral curved edge of a protruding boss 26 in the center of the head.

Centering means for the drill 22 is provided by a protruding annular rim or member 27 in the center of the boss 26.

Engaging means, for engaging a non-rotating part of drilling apparatus thereby to prevent rotation of the rivet in the workpiece under the influence of the rotating drill, comprises four abutment faces or members 28 spaced 90° apart around the boss 26, each face being radial or nearly so and being provided as the vertical side wall of a wedge-shaped pit or indentation 29.

The outer ends of the abutment faces 28 provide part of the locating annular rim 25.

The drilling apparatus is illustrated in FIG. 7. It comprises an air-operated hand held rotary tool 31 containing an air motor to rotate the drill 22 in a clockwise sense. Secured to the body of the tool is a sleeve 32 which is sprung forwardly from the tool body but is prevented from rotating by a pin 33 running in a slot in the sleeve. The sleeve 32 has a bore in which runs the drill 22 and, concentric with its front end, a recess 35 carrying dogs 34 which engage with the abutment faces 28 on the rivet head. The sleeve 32 has a cut-out 36 in its bottom for the exit of swarf.

Progressive stages in the use of the drill and drilling apparatus are illustrated in FIGS. 4, 5 and 6. The sleeve is offered to the head of the installed rivet (FIG. 4) until the outer edge of the sleeve recess 35 engages around the outer edge of the locating rim 25 on the rivet head. The dogs 34 inside the recess enter into the wedge-shaped pits 29. The air motor is then actuated to rotate the drill 22, and the tool body pushed towards the rivet. The drill tip contacts the rivet head at the outer end of the rim 27, and cuts into the rivet head, the rim 27 tending to keep the drill centered. If the rivet tends to rotate in the workpiece due to the rotating drill, it can do so only until the four abutment faces 28 contact the four dogs 34. When the drill tip enters the annular groove 23 (FIG. 6), the shank 12 of the rivet is separated from the head 13 and can be pushed out. As explained previously, this occurs before the drill tip has advanced sufficiently far to meet the near face of the workpiece, thus minimizing the likelihood of damage to the workpiece.

The invention is not restricted to the details of the foregoing example. For instance, the invention may be applied to a non-blind rivet.

We claim:

1. A removable rivet comprising a shank and a preformed heat at at least one end of the shank, the shank being insertable through workpieces and being capable of being permanently deformed to rivet the workpieces together, the rivet comprising:

an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet co-axially with the shank until the drill meets the annular groove;

locating means carried by the head of the rivet for cooperating with a drilling apparatus having the drill, thereby to locate the drill co-axially with the annular groove; and engaging means carried by the head of the rivet for engaging a non-rotating part of drilling apparatus thereby to prevent rotation of the rivet under the influence of the rotating drill wherein the annular groove lies entirely within the head, thereby to facilitate separation of the head from the shank by the drill without need of the drill entering the shank.

2. A rivet as claimed in claim 1, in wherein the locating means comprises one of an annular rim and a boss.

3. A rivet as claimed in claim 2 which comprises a sleeve within which said drill is positioned, said sleeve having a plurality of dogs engageable with said locating means.

4. A rivet as claimed in claim 1 wherein the head of the rivet includes centering means and wherein said centering means is engageable by the drill and assists in centering the drill co-axially with the rivet shank.

5. A rivet as claimed in claim 1, wherein the centering means comprises one of an annular rim and a boss.

6. A rivet as claimed in claim 1, wherein the engaging means is shaped such that the initial angular orientation of the non-rotating part of the drilling apparatus is variable.

7. A rivet as claimed in claim 6, wherein the engaging means comprises a plurality of abutments spaced apart angularly around the rivet head.

8. A rivet as claimed in claim 7, wherein radially outer ends of the abutments comprise at least part of the locating means.

9. A removable rivet comprising a shank and a preformed heat at at least one end of the shank, the shank being insertable through workpieces and being capable of being permanently deformed to rivet the workpieces together, the rivet comprising:

- an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet co-axially with the shank until the drill meets the annular groove;
- a locating device carried by the head of the rivet and cooperating with a drilling apparatus having the drill, thereby to locate the drill co-axially with the annular groove; and
- an engaging member carried by the head and engaging a non-rotating part of drilling apparatus thereby to prevent rotation of the rivet under the influence of the rotating drill wherein the annular groove lies entirely within the head, thereby to facilitate separation of the head from the shank by the drill without need of the drill entering the shank.

10. A rivet as claimed in claim 9, wherein the locating device comprises one of an annular rim and a boss.

11. A rivet as claimed in claim 10, which comprises a sleeve within which said drill is positioned, said sleeve having a plurality of dogs engageable with said locating member.

12. A rivet as claimed in claim 11, wherein the head of the rivet includes a centering member and wherein said centering member is engageable by the drill and assists in centering the drill coaxially with the rivet shank.

13. A rivet as claimed in claim 9, wherein the centering member comprises one of an annular rim and a boss.

14. A rivet as claimed in claim 9, wherein the engaging member is shaped such that the initial angular orientation of the non-rotating part of the drilling apparatus is variable.

15. A rivet as claimed in claim 14, wherein the engaging member comprises a plurality of abutments spaced apart angularly around the rivet head.

16. A rivet as claimed in claim 15, wherein radially outer ends of the abutments comprise at least part of the locating device.

17. A method of separating the head from the shank of a removable rivet, the removable rivet including a shank and a preformed heat at at least one end of the shank, the shank being insertable through workpieces and being capable of being permanently deformed to rivet the workpieces together, the rivet having an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet co-axially with the shank until the drill meets the annular groove; locating means carried by the head of the rivet for cooperating with a drilling apparatus having the drill, thereby to locate the drill co-axially with the annular groove; and first engaging means carried by the head of the rivet for engaging a non-rotating part of drilling apparatus thereby to prevent rotation of the rivet under the influence of the rotating drill wherein the annular groove lies entirely within the head, thereby to facilitate separation of the head from the shank by the drill without need of the drill entering the shank, which method comprises:

- drilling through the head of the rivet with the drill, the drill having substantially the same diameter as the rivet shank and being substantially co-axially aligned therewith, until the drill breaks into the annular groove.

18. A method of separating the head from the shank of a removable rivet, the rivet including a shank and a preformed head at at least one end of the shank, the shank being insertable through workpieces and being capable of being permanently deformed to rivet the workpieces together, the rivet having an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet co-axially with the shank until it meets the annular groove; locating means carried by the head of the rivet for cooperating with a drilling apparatus having the drill, thereby to locate the drill co-axially with the annular groove; and first engaging means carried by the head of the rivet for engaging a non-rotating part of drilling apparatus thereby to prevent rotation of the rivet under the influence of the rotating drill wherein the annular groove lies entirely within the head, thereby to facilitate separation of the head from the shank by the drill without need of the drill entering the shank, and wherein the drill comprises a rotatable drill and second engaging means located on a non-rotating part of the drilling apparatus for engaging with the first engaging means on the rivet head thereby to prevent rotation of the rivet, which comprises:

- locating the drill coaxially with the annular groove by use of the locating means; and
- engaging the second engaging means on the non-rotating part of the drilling apparatus with the first engaging means on the rivet head so as to prevent rotation of the rivet.

19. A method of separating the head from the shank of a removable rivet, the removable rivet including a shank and a preformed heat at at least one end of the shank, the shank being insertable through workpieces and being capable of being permanently deformed to rivet the workpieces together, the rivet comprising an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet co-axially with the shank until the drill meets the annular groove; a locating device carried by the head of the rivet and cooperating with a drilling apparatus having the drill, thereby to locate the drill co-axially with the annular groove; and an engaging member carried by the head and engaging of the rivet and engaging a non-rotating part of drilling apparatus thereby to prevent rotation of the rivet under the influence of the rotating drill wherein the annular groove lies entirely within the head, thereby to facilitate separation of the head from the shank by the drill without need of the drill entering the shank, which method comprises:

drilling through the head of the rivet with the drill, the drill having substantially the same diameter as the rivet shank and being substantially co-axially aligned therewith, until the drill breaks into the annular groove.

20. A method of separating the head from the shank of a removable rivet comprising a shank and a preformed head at at least one end of the shank, the shank being insertable through workpieces and being capable of being permanently deformed to rivet the workpieces together, the rivet comprising an annular groove at the junction of the shank and the head, the annular groove extending radially inwardly of the diameter of the shank, thereby to facilitate separation of the head from the shank when a drill of a diameter substantially equal to that of the shank is applied to the head of an installed rivet coaxially with the shank until the drill meets the annular groove; a locating device carried by the head of the rivet and cooperating with a drilling apparatus having the drill, thereby to locate the drill co-axially with the annular groove; a first engaging member carried by the head of the rivet and engaging a non-rotating part of drilling apparatus thereby to thereby prevent rotation of the rivet under the influence of the rotating drill; and a second engaging member located on a non-rotating part of the drilling apparatus and engaging with the first engaging member on the rivet head to thereby prevent rotation of the rivet, which method comprises:

locating the drill coaxially with the annular groove by use of the locating device; and engaging the second engaging member on the non-rotating part of the drilling apparatus with the first engaging member on the rivet head so as to prevent rotation of the rivet.

* * * * *